United States Patent [19]

(12) United States Patent
Hana et al.

(10) Patent No.: US 10,014,750 B2
(45) Date of Patent: Jul. 3, 2018

(54) ROTATING ELECTRICAL MACHINE WITH REMOVABLE AIR FLOW GUIDES

(71) Applicant: MITSUBISHI ELECTRIC CORPORATION, Chiyoda-ku (JP)

(72) Inventors: Norihiko Hana, Chiyoda-ku (JP); Masahiro Kondo, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 171 days.

(21) Appl. No.: 15/032,469

(22) PCT Filed: Oct. 16, 2014

(86) PCT No.: PCT/JP2014/077547
§ 371 (c)(1),
(2) Date: Apr. 27, 2016

(87) PCT Pub. No.: WO2015/098249
PCT Pub. Date: Jul. 2, 2015

(65) Prior Publication Data
US 2016/0261172 A1    Sep. 8, 2016

(30) Foreign Application Priority Data

Dec. 24, 2013  (JP) ................................. 2013-265069

(51) Int. Cl.
  *H02K 9/06*  (2006.01)
  *H02K 5/20*  (2006.01)
  *H02K 9/10*  (2006.01)
(52) U.S. Cl.
  CPC ................ *H02K 9/06* (2013.01); *H02K 9/10* (2013.01)

(58) Field of Classification Search
  CPC .. H02K 9/06; H02K 9/10; H02K 9/02; H02K 9/04; H02K 9/08; H02K 9/12; H02K 5/15; H02K 5/20
  (Continued)

(56) References Cited

U.S. PATENT DOCUMENTS

| 4,039,872 | A |   | 8/1977 | Armor et al. |
| 4,208,599 | A | * | 6/1980 | Armor ..................... H02K 9/10 310/53 |

(Continued)

FOREIGN PATENT DOCUMENTS

| JP | 52-155303 | 12/1977 |
| JP | 55-98160  | 12/1978 |

(Continued)

OTHER PUBLICATIONS

International Search Report dated Jan. 6, 2015, in PCT/JP2014/077547 filed Oct. 16, 2014.

*Primary Examiner* — Michael Andrews
(74) *Attorney, Agent, or Firm* — Oblon, McClelland, Maier & Neustadt, L.L.P.

(57) ABSTRACT

A power generator for which assembly work can be performed under a state in which a separable body is separated from a first frame portion and a first partition plate portion when a stator is assembled inside a frame. Therefore, an end bell to be integrated with a second partition plate portion has a small diameter, and can be arranged close to a rotor. As a result, the end bell made of an insulating resin can be arranged only in a portion in which a flux-loss reduction effect is significant.

10 Claims, 17 Drawing Sheets

(58) Field of Classification Search
USPC .............................. 310/59, 58, 60 R, 62, 89
See application file for complete search history.

(56) References Cited

U.S. PATENT DOCUMENTS 4,260,327 A * 4/1981 Armor ..................... H02K 9/10
                                                                                  415/189
5,635,779 A * 6/1997 Baer ........................ H02K 9/00
                                                                                  310/59

FOREIGN PATENT DOCUMENTS

| JP | 55-8294 A | 1/1980 |
| JP | 58-93451 A | 6/1983 |
| JP | 11-150915 A | 6/1999 |
| JP | 11-164520 A | 6/1999 |
| JP | 2001-95204 A | 4/2001 |
| JP | 2011-250566 A | 12/2011 |

* cited by examiner

# ROTATING ELECTRICAL MACHINE WITH REMOVABLE AIR FLOW GUIDES

TECHNICAL FIELD

The present invention relates to a rotary electric machine including an end bell configured to form an air guiding path inside a frame having a cylindrical shape.

BACKGROUND ART

Hitherto, there has been known a rotary electric machine using end bells configured to form air guiding paths for refrigerant inside a frame that houses a stator and a rotor provided on an inner side of the stator to efficiently send the refrigerant to fans configured to circulate the refrigerant inside the frame (see, for example, Patent Literature 1).

CITATION LIST

Patent Literature

[PTL 1] JP 2001-95204 A (paragraph 0032, FIG. 1)

SUMMARY OF INVENTION

Technical Problem

In the rotary electric machine, when a metal material (such as an iron material) is used for the end bells, a loss is generated in each of the end bells due to passage of magnetic fluxes generated from the rotor and the stator.

In order to reduce the loss, use of an insulating resin, which is non-metallic, for the end bells is supposed.

When the end bells made of the insulating resin are fixed to the frame by using bolts, however, there is a problem in that a coupling force generated by axial forces of the bolts is lowered in coupling portions between the end bells and the frame due to deterioration of the end bells over time.

The present invention has been made to solve the problem described above, and has an object to provide a rotary electric machine with suppression of reduction in coupling force between an end bell made of an insulating resin and a second partition plate portion made of a metal due to deterioration of the end bell over time.

Solution to Problem

According to one embodiment of the present invention, there is provided a rotary electric machine, including:
a frame, which has a cylindrical shape;
a stator, which is provided inside the frame so as to be supported by the frame;
a rotor, which is provided to extend on a central axis line of the stator;
a fan, which is mounted to a rotary shaft of the rotor, and is configured to generate cooling air;
a partition plate, which is provided on at least one side of the stator in an axial line direction of the stator, and is configured to circulate the cooling air inside the stator and to guide the cooling air toward the fan; and
an end bell, which is provided to the partition plate, and is configured to form an air ventilation path for the cooling air between the partition plate and the fan, the end bell being made of an insulating resin,
the frame including a first frame portion and a second frame portion, which is configured to be separated from the first frame portion,
the partition plate including a first partition plate portion and a second partition plate portion, which is made of a metal integrally with the end bell, and is configured to be separated from the first partition plate portion,
the second frame portion, the second partition plate portion, and the end bell being integrated to form a separable body, which is configured to be separated from the first frame portion and the first partition plate portion.

Advantageous Effects of Invention

According to the rotary electric machine of the one embodiment of the present invention, the end bell is made of the insulating resin and is molded integrally with the second partition plate portion of the partition plate. Therefore, as a result of unnecessity of fastening with bolts or the like for the coupling between the end bell and the second partition plate portion, reduction in coupling force to the second partition plate portion due to deterioration of the end bell over time can be suppressed.

Further, the separable body formed by integrating the second frame portion, the second partition plate portion, and the end bell is separable from the first frame portion and the first partition plate portion.

Therefore, for assembling the stator into the frame, assembly work can be implemented under a state in which the separable body is separated from the first frame portion and the first partition plate portion. Therefore, the end bell to be integrated with the second partition plate portion has a small diameter, and can be arranged close to the rotor. As a result, the end bell made of the insulating resin can be arranged only in a portion in which a flux-loss reduction effect is significant.

DESCRIPTION OF EMBODIMENTS

Figure 1:
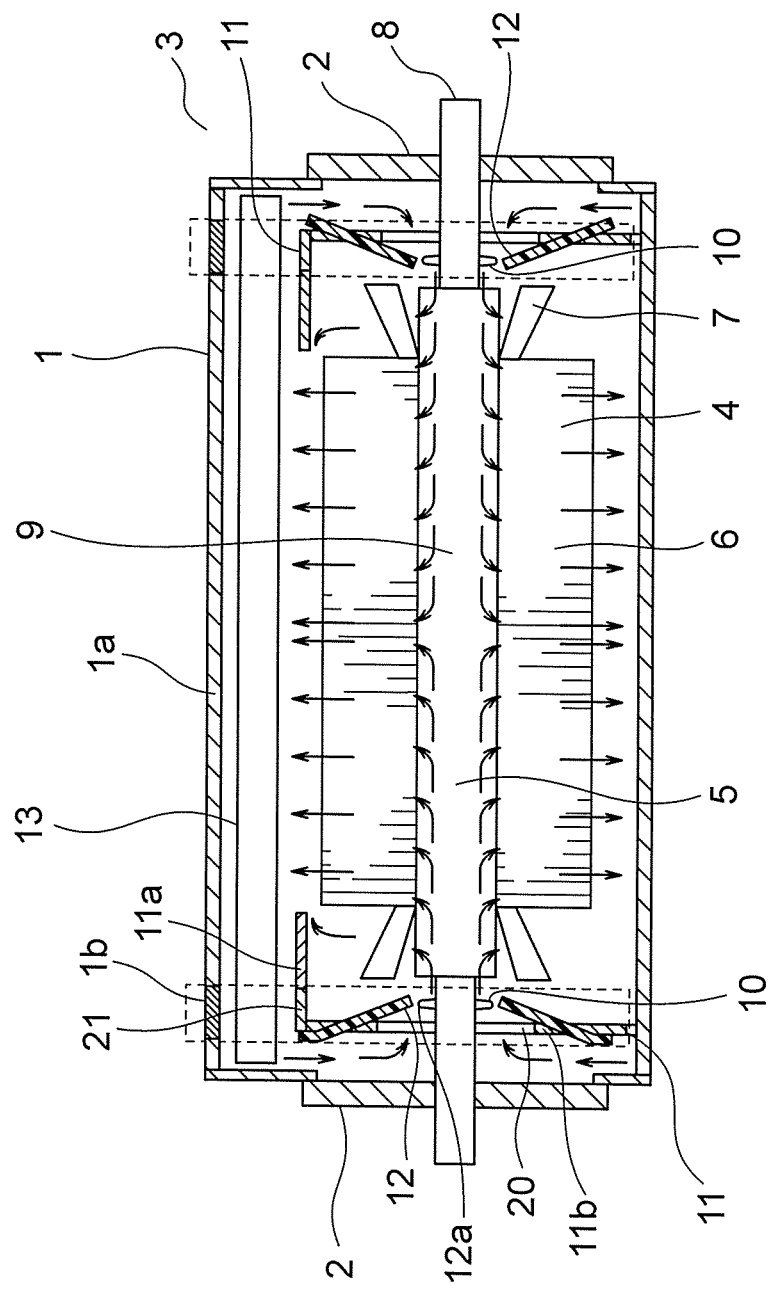
FIG. 1 is a side sectional view for illustrating a power generator according to a first embodiment of the present invention.

Referring to the accompanying drawings, a power generator according to each of embodiments of the present invention is described below. In the drawings, the same or corresponding members and parts are denoted by the same reference symbols for description.

First Embodiment

Figure 2:
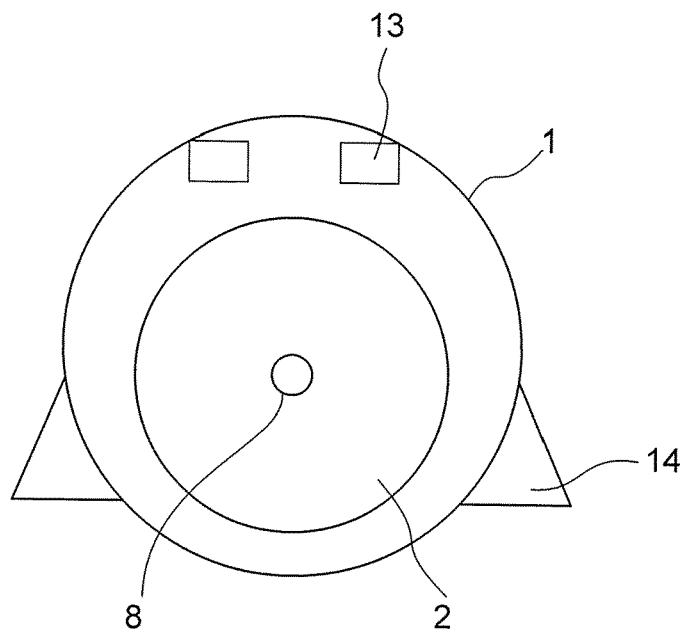
FIG. 2 is a front view of FIG. 1.

FIG. 1 is a side sectional view for illustrating a power generator according to a first embodiment of the present invention, and FIG. 2 is a front view of FIG. 1. The power generator, which is a rotary electric machine, includes brackets 2 mounted to both end portions of a frame 1 (for example, having a diameter of from 3 meters to 4 meters and a length of from 6 meters to 7 meters) made of iron having a cylindrical shape with inwardly bent both sides. Inside a case 3 constructed by the frame 1 and the brackets 2, a stator 4 is provided. On a central axis line of the stator 4, a rotor 5 is provided with a gap secured from an inner wall surface of the stator 4. Note that, the stator 4 is fixed to the frame 1 by, for example, pairs of supporting members (not shown), each being opposed to each other, at four positions at intervals in an axial line direction.

The stator 4 includes a stator core 6 formed by laminating thin steel plates, and a stator coil 7 formed by winding copper wires around slots formed on the stator core 6 so as to extend in the axial line direction.

The rotor 5 includes a rotor shaft 8 having both end portions respectively passing through the pair of brackets 2 opposed to each other, and a rotor core 9 fixed to an intermediate portion of the rotor shaft 8.

Axial fans 10 are fixed to both sides of the rotor shaft 8. On the bracket 2 side of each of the axial fans 10, a partition plate 11 made of iron having an upper portion bent toward the stator 4 and an end surface with a lower half being fixed to an inner wall surface of the frame 1 by welding is provided.

An end bell 12 configured to form an air guiding path for air is provided to each of the partition plates 11. The end bells 12 are made of an insulating resin. A central axis line of a hole 12a formed in a center portion of each of the end bells 12 is identical with a central axis line of the rotor shaft 8. An inner diameter of each of the end bells 12 is larger than an outer diameter of a larger one of an outer diameter of the rotor core 9 and that of the axial fans 10.

In an upper space inside the case 3, a pair of gas coolers 13 extending in the axial line direction, inside which refrigerant circulates, is provided.

In the power generator supported by frame legs 14, the axial fans 10 are rotated by rotation of the rotor shaft 8. Cooling air generated by the rotation of the axial fans 10 passes through the rotor 5 and the stator 4 as indicated by the arrows. The cooling air whose temperature has been increased through the rotor 5 and the stator 4 is directly cooled in the gas coolers 13. The cooled air is split into streams toward both sides in the axial line direction, and the streams are each guided to the end bell 12 through a space between the partition plate 11 and the bracket 2 to be sucked into the axial fan 10.

Subsequently, the cooling air circulates toward the rotor 5 and the stator 4 again as indicated by the arrows.

Figure 3:
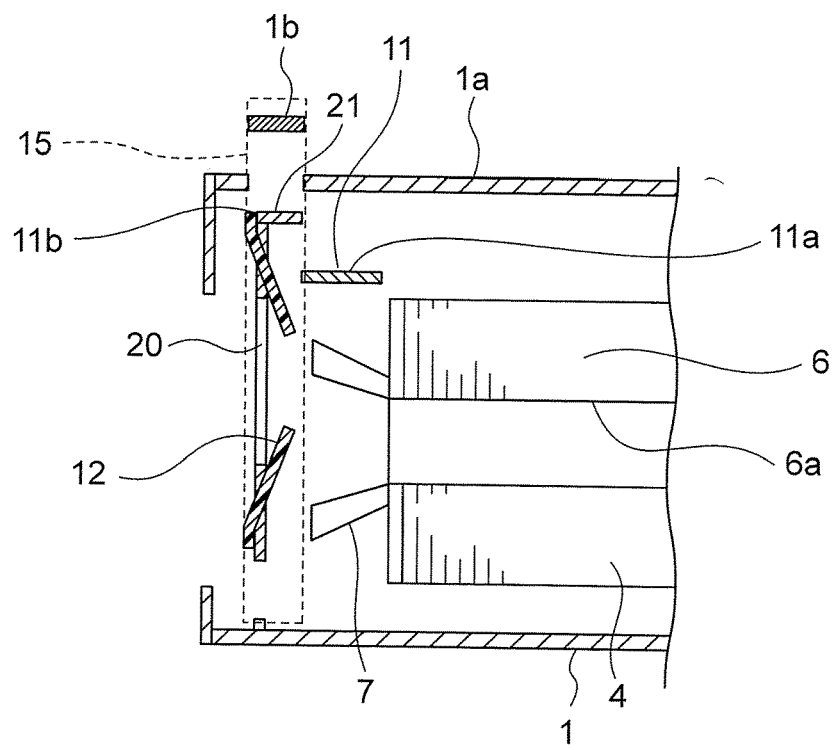
FIG. 3 is a partial sectional view for illustrating the power generator in FIG. 1 when a separable body is separated from the power generator.
Figure 4:
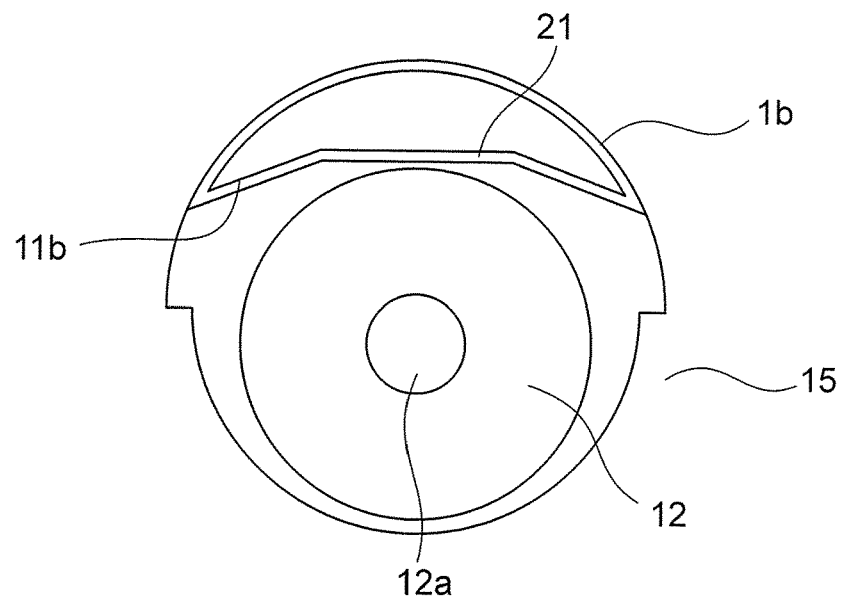
FIG. 4 is a front view for illustrating the separable body 15 in FIG. 3.

FIG. 3 is a partial sectional view for illustrating the power generator in FIG. 1 when a separable body 15 is separated from the power generator, and FIG. 4 is a front view for illustrating the separable body 15 in FIG. 3.

The separable body 15 includes a second frame portion 1b configured to be separated from a first frame portion 1a of the frame 1, a second partition plate portion 11b configured to be separated from a first partition plate portion 11a of the partition plate 11, and the end bell 12 integral with the second partition plate portion 11b.

The second frame portion 1b is formed by cutting an upper portion of the frame 1 into a minor arc shape.

The second partition plate portion 11b includes a guiding portion 21 that is bent by 90° and extends along an axial line direction of the rotor 5 as an upper portion of the second partition plate portion 11b. The guiding portion 21 has a function of guiding the cooling air toward the stator 4. The guiding portion 21 is bent at an intermediate portion and has both end portions connected to the second frame portion 1b. The intermediate portion forms a space portion in corporation with the second frame portion 1b. Further, a distal end surface of the guiding portion 21 is connected to an end surface of the first partition plate portion 11a. Further, a ventilation hole 20 is formed in a central portion of a portion of the second partition plate portion 11b, which extends in a direction perpendicular to the axial line direction of the rotor 5.

Figure 5:
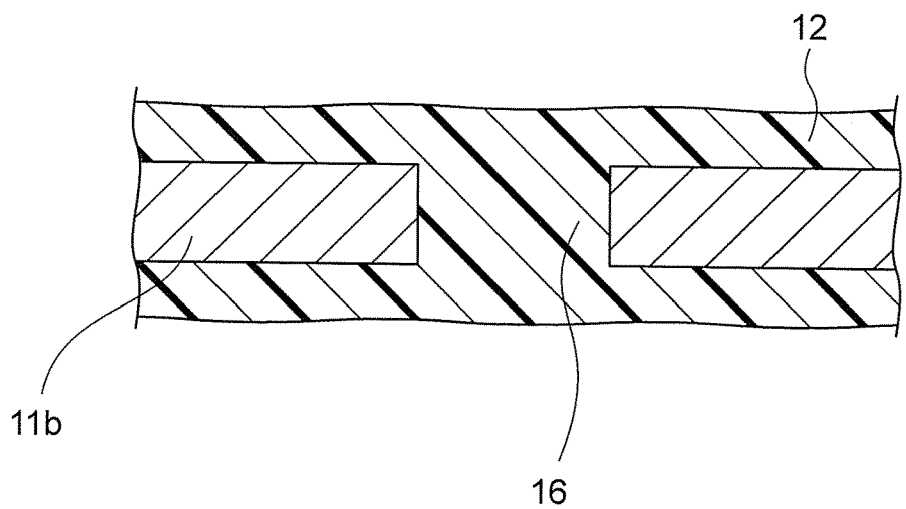
FIG. 5 is a sectional view for illustrating a coupling portion in which the second partition plate portion and the end bell are integrated with each other.

FIG. 5 is a sectional view for illustrating a coupling portion in which the second partition plate portion 11b and the end bell 12 are integrated with each other.

A procedure of integrating the second partition plate portion 11b and the end bell 12, which are constituent elements of the separable body 15, is as follows.

First, the second partition plate portion 11b having a plurality of through holes 16 formed in the second partition plate portion 11b, through each of which reinforced fiber such as glass fiber or aramid fiber is caused to pass in a corrugated fashion, is placed inside a die.

Next, a polyester resin, which is an insulating resin, is injected into the die to form the end bell 12 molded integrally with the second partition plate portion 11b.

As the insulating resin, a vinyl ester resin, an epoxy resin, a phenol resin, a urea resin, a polyurethane resin, a diacryl phthalate resin, and a polyimide resin may also be used.

Figure 6:
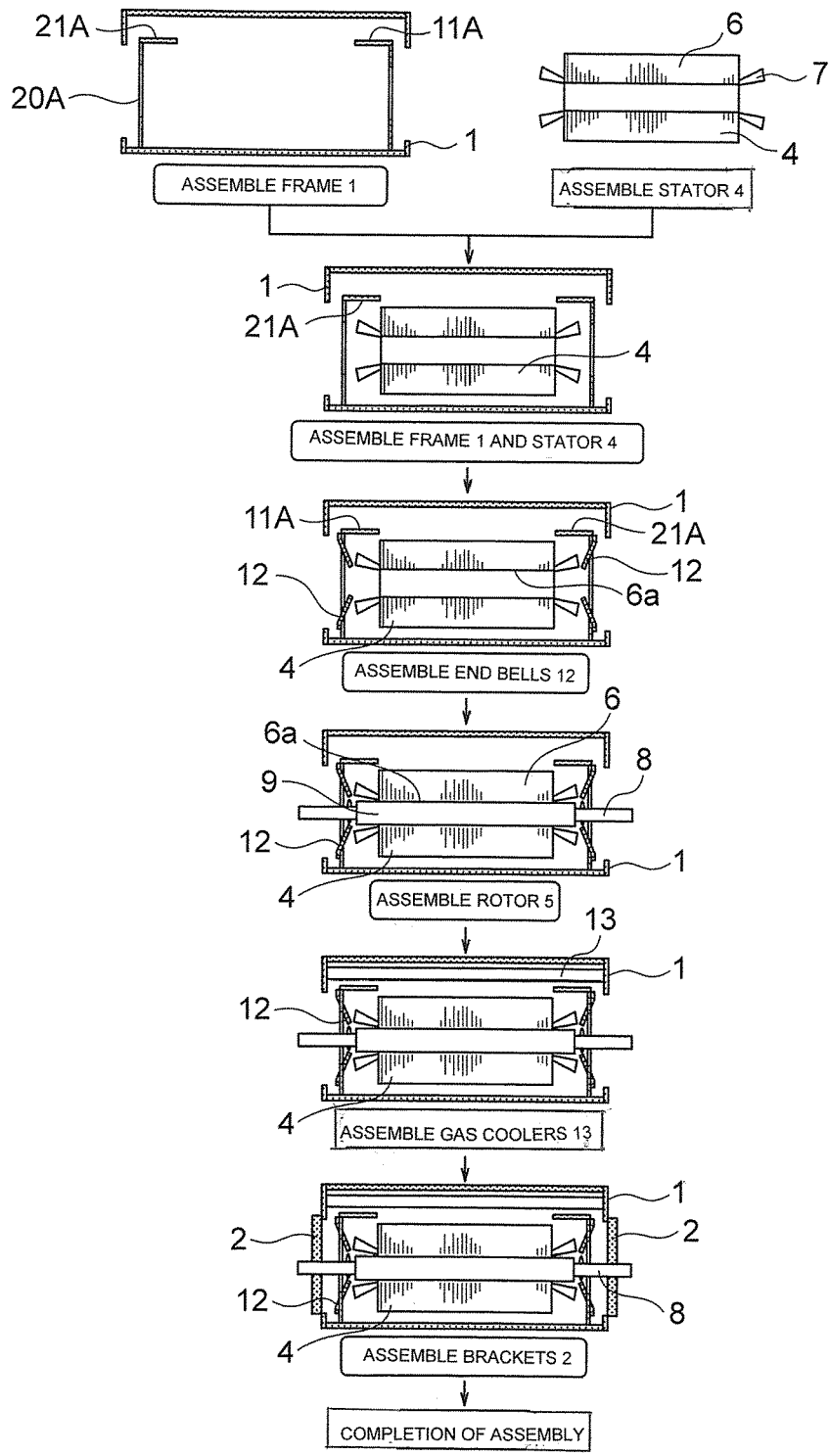
FIG. 6 is a diagram for illustrating a procedure of assembling a related-art large-sized power generator.

FIG. 6 is a diagram for illustrating a procedure of assembling a related-art large-sized power generator without the separable bodies 15 of the first embodiment.

First, the frame 1 to which partition plates 11A are mounted and the stator 4 are assembled separately. After the stator 4 is moved inside the frame 1 along an axial line direction of the frame 1, the stator 4 is fixed to the frame 1 through intermediation of the supporting members (not shown). Alternatively, the partition plates 11A and the stator 4 may be assembled inside the frame 1.

Thereafter, the end bells 12 are inserted from both sides of the frame 1, and the end bells 12 are coupled to the partition plates 11A by using bolts (not shown).

Next, the rotor core 9 integral with the rotor shaft 8 is inserted into a hole 6a of the stator core 6 to assemble the rotor 5. When spaces between the end bells 12 and the axial fans 10 are large after the insertion of the rotor core 9, additional members are used for the spaces to fill the spaces.

Thereafter, the two gas coolers 13 are fixed in the upper space inside the frame 1.

Finally, after being inserted over the rotor shaft 8 from both sides of the frame 1, the brackets 2 are fixed to the frame 1.

Figure 7:
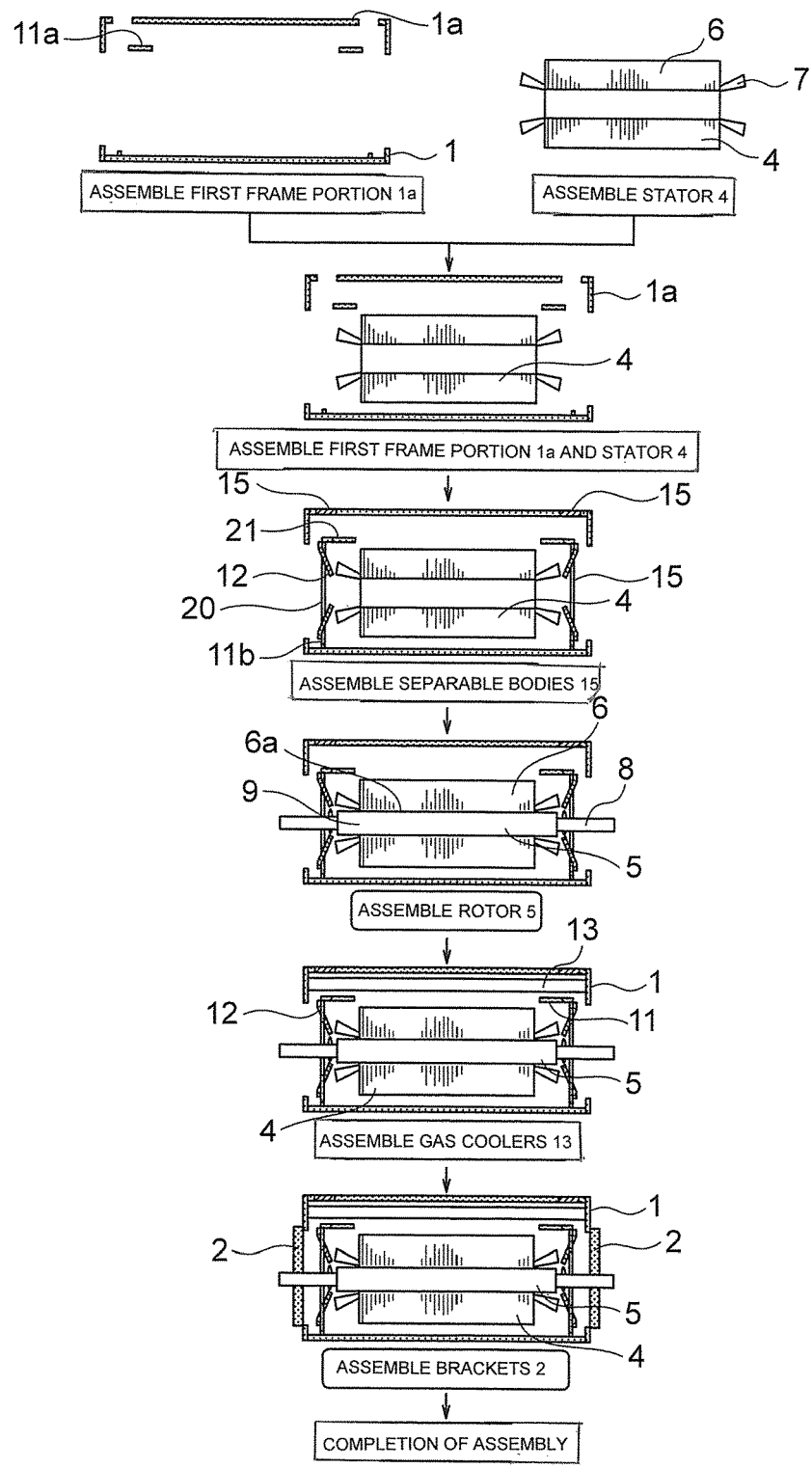
FIG. 7 is a diagram for illustrating a procedure of assembling the power generator illustrated in FIG. 1.
Figure 8:
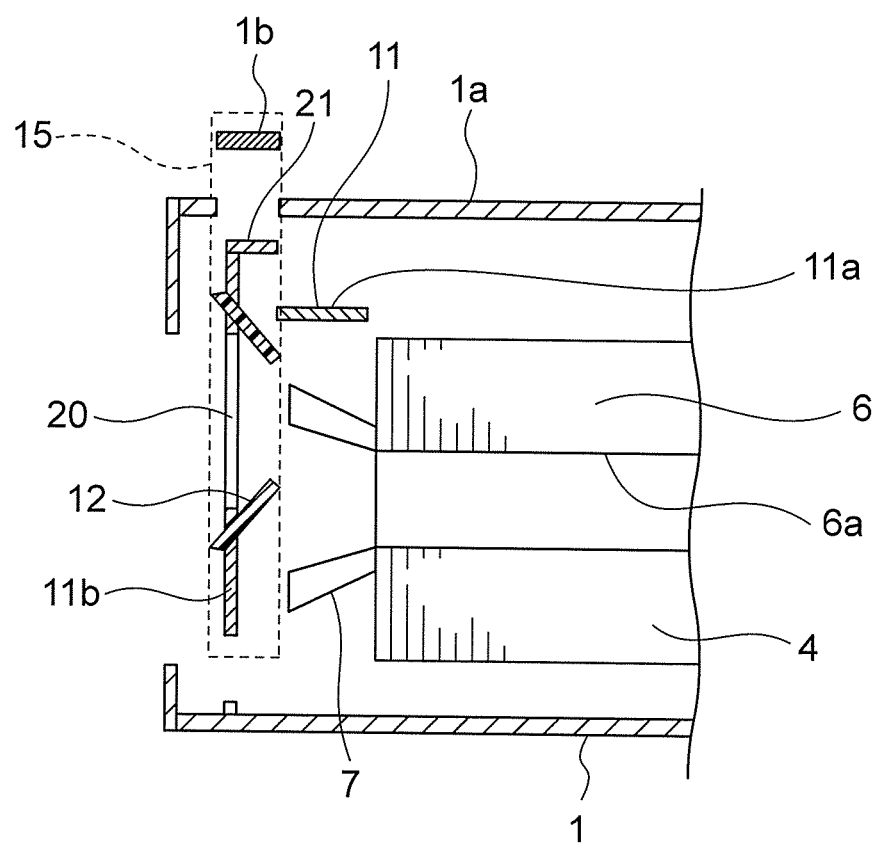
FIG. 8 is a partial sectional view for illustrating the power generator in FIG. 1 when a separable body is separated from the power generator.

FIG. 7 is a diagram for illustrating a procedure of assembling the power generator illustrated in FIG. 1 according to the first embodiment.

For the power generator of the first embodiment, the first frame portion 1a to which the first partition plate portions 11a are mounted, and the stator 4 are first assembled separately. After the stator 4 is moved inside the first frame portion 1a along an axial line direction of the first frame portion 1a, the stator 4 is fixed inside the first frame portion 1a through intermediation of the supporting members (not shown). Alternatively, the stator 4 may be assembled inside the first frame portion 1a.

Thereafter, after the separable bodies 15 are moved down from above along a radial direction so as to be located on both sides of the first frame portion 1a, flanges (not shown) of the first frame portion 1a and the second frame portion 1b, which project in the radial direction so as to be opposed to each other, are coupled by using coupling means to couple the first frame portion 1a and the second frame portions 1b to each other, thereby forming the frame 1.

Next, the rotor core 9 integral with the rotor shaft 8 is inserted into the hole 6a of the stator core 6.

When the spaces between the end bells 12 and the axial fans 10 are large after the insertion of the rotor core 9, additional members are used for the spaces to fill the spaces.

Thereafter, the two gas coolers 13 are fixed in the upper space inside the frame 1.

Finally, after being inserted over the rotor shaft 8 from both sides of the frame 1, the brackets 2 are fixed to the frame 1.

For the assembly of the related-art large-sized power generator illustrated in FIG. 6, in order to install the stator 4 inside the frame 1, guiding portions 21A of the partition plates 11A, which are upper end portions of the partition plates 11A and extend along the axial line direction of the stator 4, need to be located on an outer side of the stator 4 so as to move the stator 4 horizontally to be assembled inside the frame 1. Further, a diameter of each of ventilation holes 20A of the partition plates 11A needs to be set larger than an outer diameter of the stator 4.

On the other hand, in the case of the power generator of the first embodiment, when the stator 4 is installed inside the frame 1, the end bells 12, and the second frame portions 1b and the second partition plate portions 11b around the end bells 12 are not present. Therefore, the guiding portions 21 of the second partition plate portions 11b of the partition plates 11, which are provided along the axial line direction of the stator 4, are not restricted to be located on the outer side of the stator 4 in the radial direction. Similarly, the diameter of each of the ventilation holes 20 is not restricted to be set larger than the outer diameter of the stator 4.

Therefore, in the related-art large-sized power generator, the end bells 12 are inevitably fixed in the vicinity of the guiding portions 21A. Therefore, a diameter of a fixing portion of the end bell 12 to the partition plate 11A increases. In addition, a distance from each of the end bells 12 to a region close to the rotor 5 also increases.

On the other hand, in the power generator of the first embodiment, the guiding portions 21 and the diameter of each of the ventilation holes 20 of the second partition plate portions 11b can be set smaller than those of the related art. The diameter of each of the end bells 12 fixed to the second partition plate portions 11b can also be set smaller than the outer diameter of the stator core 6.

Therefore, the end bells 12 made of the insulating resin can be arranged so as to be located only in peripheral regions of the rotor 5 in which a flux-loss reduction effect is significant.

In this manner, as compared with the related-art case where the end bells made of an insulating resin are used, each of the end bells 12 of the first embodiment has a smaller diameter in a portion to be molded integrally with each of the partition plates 11. As a result, flexural rigidity of the end bells 12 in an axial line direction of the power generator can be increased.

By increasing the flexural rigidity in the axial line direction, an exciting force generated by the rotation of the rotor 5 and vibration due to an electromagnetic exiting force generated in the stator 4 during an operation of the power generator are reduced to decrease an external force applied to the end bells 12.

Incidentally, there is a possibility that an ambient temperature of the end bells 12 becomes equal to 130° C. that is a maximum working temperature of the power generator at maximum. Therefore, the related-art power generator including the end bells 12 made of the insulating resin fixed to the partition plates 11A by using bolts has a fear of occurrence of creep deformation in the end bells 12.

On the other hand, according to the power generator of the first embodiment, the end bells 12 made of the insulating resin are molded integrally with the second partition plate portions 11b of the partition plates 11. Therefore, fastening with bolts or the like is not required for the coupling between the end bells 12 and the second partition plate portions 11b.

Therefore, in the power generator of the first embodiment without requiring the coupling with bolts, reduction in coupling force to the second partition plate portions 11b due to the deterioration (creep deformation) of the end bells 12 over time does not occur.

Further, the second frame portions 1b of the separable bodies 15 and the first frame portion 1a of the frame 1 are made of the same metal material (such as an iron material). As a result, for the bolts between the second frame portions 1b and the first frame portion 1a, reduction in axial forces of the bolts due to the deterioration over time can be suppressed.

Further, the separable bodies 15 are separable from the power generator. As a result, as compared with the power generator including the partition plates 11A, specifically, which are molded integrally with the end bells 12 in an inseparable state, workability in molding in an integral molding step for the second partition plate portions 11b and the end bells 12 is improved.

Further, workability in post-processing after the molding, such as burr processing, is also improved.

Further, the separable bodies 15 and the first frame portion 1a are coupled by using the bolts. For maintenance after manufacture or the like, the power generator can be separated in a procedure illustrated in FIG. 9 as needed.

Figure 9:
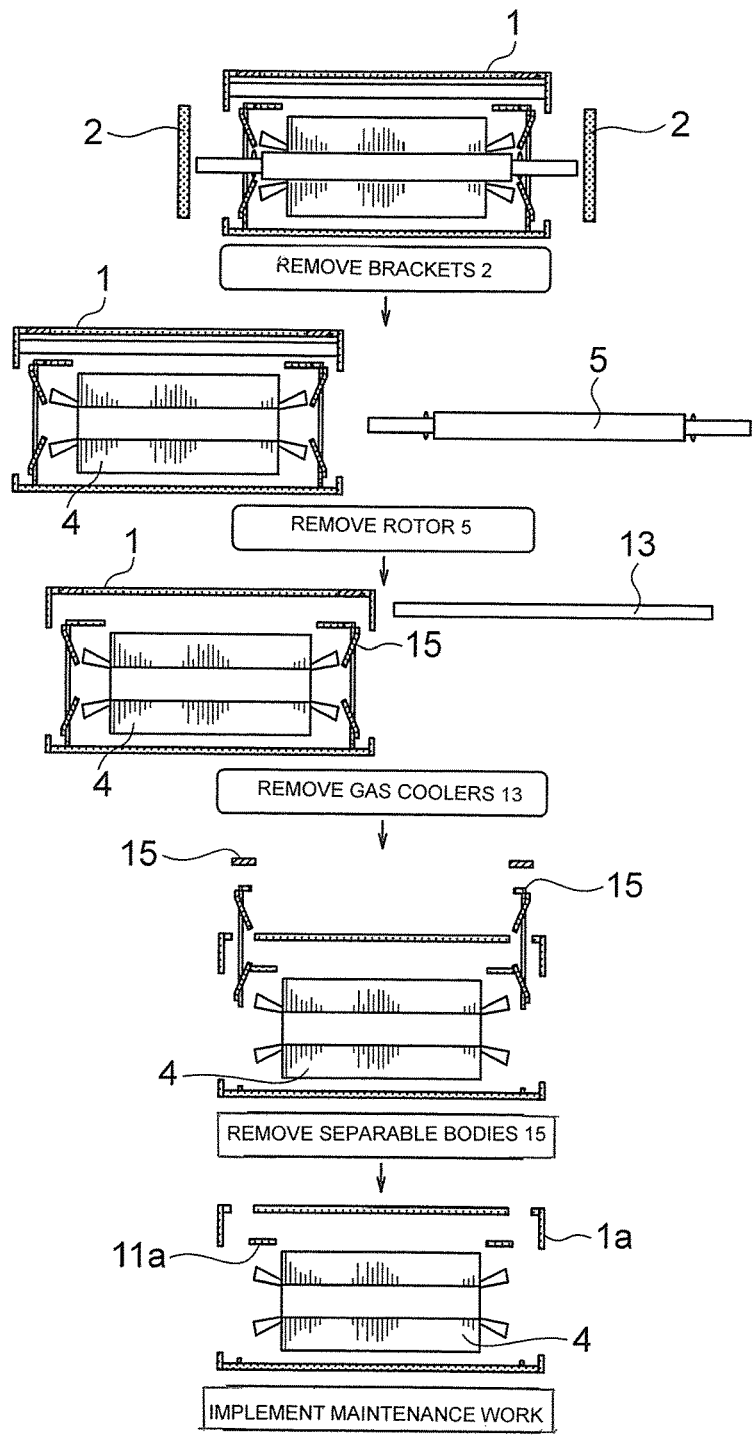
FIG. 9 is a diagram for illustrating a separation procedure of the power generator illustrated in FIG. 1.

As illustrated in FIG. 9, the brackets 2 on both sides of the frame 1 are first removed. After the rotor 5 and the gas coolers 13 are removed, the separable bodies 15 are lifted upward so as to be separated from the first frame portion 1a.

Figure 10:
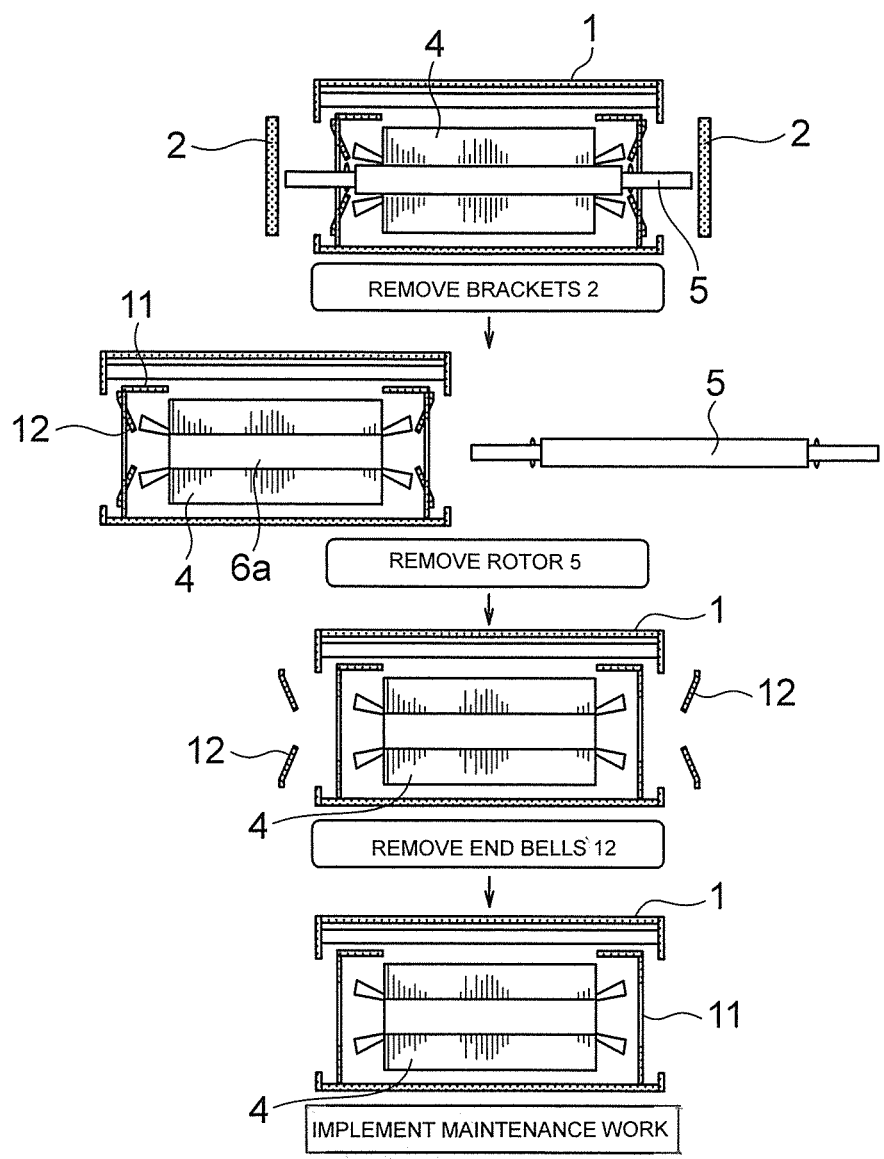
FIG. 10 is a diagram for illustrating a separation procedure of the related-art power generator.

On the other hand, FIG. 10 is a diagram for illustrating a separation procedure during maintenance work for the related-art power generator.

In this case, after the brackets 2 are first removed from the frame 1, the rotor 5 is removed. Subsequently, the end bells 12 are separated from the partition plates 11.

In this manner, when the power generator of the first embodiment and the related-art power generator are compared with each other for the maintenance work, large spaces can be secured on both sides of the stator 4 in the axial line direction, correspondingly to the amount of removal of the separable bodies 15. Therefore, workability in maintenance is improved.

Second Embodiment

Figure 11:
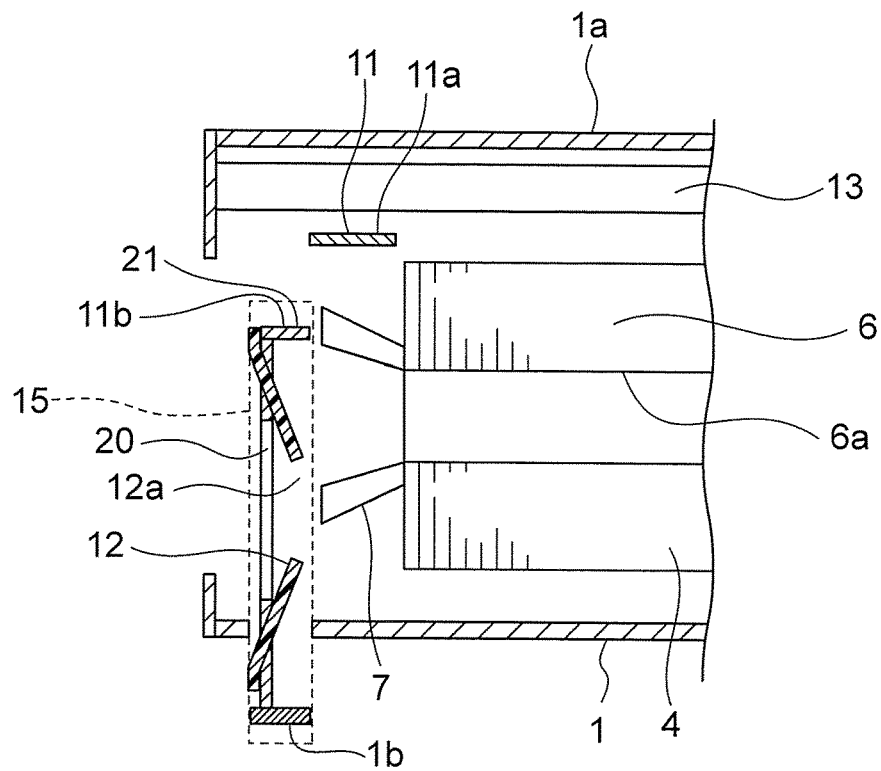
FIG. 11 is a partial sectional view for illustrating a power generator according to a second embodiment of the present invention when the separable bodies are separated from the power generator.
Figure 12:
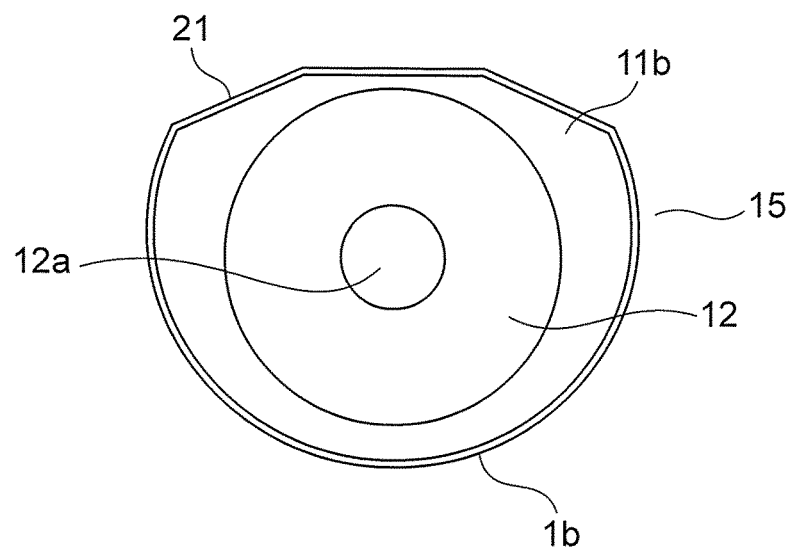
FIG. 12 is a front view for illustrating the separable body in FIG. 11.

FIG. 11 is a partial sectional view for illustrating a power generator according to a second embodiment of the present invention when the separable bodies 15 are separated from the power generator, and FIG. 12 is a front view for illustrating the separable body 15 in FIG. 11.

In this embodiment, the separable body 15 includes the second frame portion 1b configured to be separated from the first frame portion 1a of the frame 1, the second partition plate portion 11b configured to be separated from the first partition plate portion 11a of the partition plate 11, and the end bell 12 integral with the second partition plate portion 11b.

The second frame portion 1b corresponds to a lower portion of the frame 1.

The remaining configuration is the same as that of the power generator of the first embodiment.

According to the power generator, the separable bodies 15 can be inserted upward along the radial direction from the lower side of the frame 1 so as to be located on both sides of the first frame portion 1a.

Figure 13:
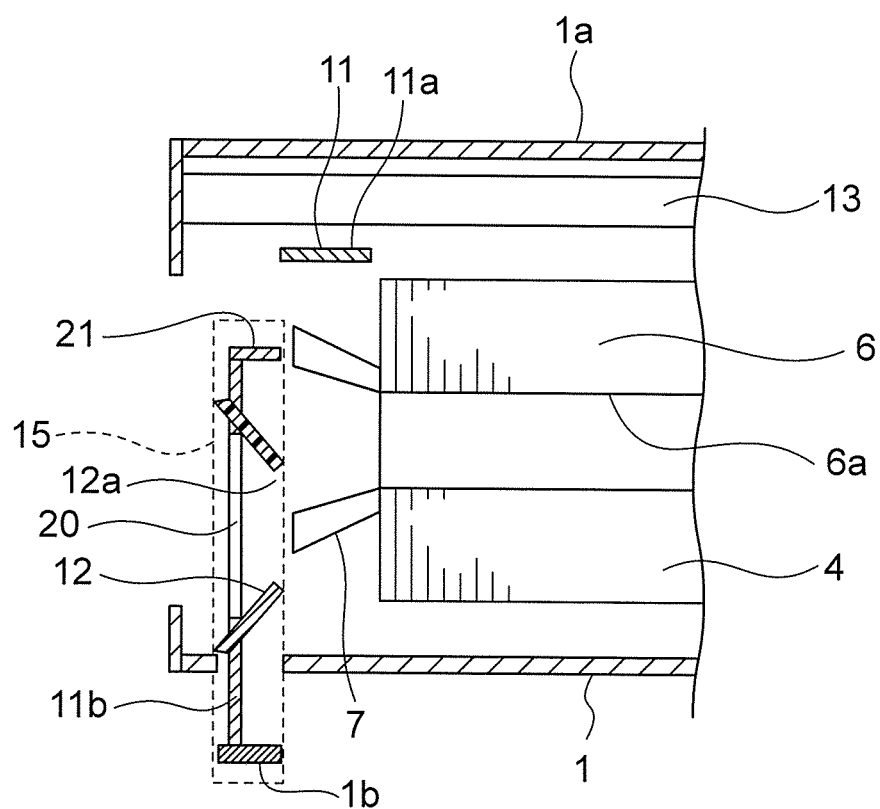
FIG. 13 is a partial sectional view for illustrating the power generator in FIG. 11 when a separable body is separated from the power generator.

Therefore, similarly to the power generator of the first embodiment, even in the power generator of this embodiment, the portion of the end bell 12, which is molded integrally with the second partition plate portion 11b of the partition plate 11 illustrated in FIG. 13, can be located closer to the rotor shaft 8 side, and the diameter of the end bell 12 can be set smaller than the outer diameter of the stator core 6. Thus, the same effects as those of the power generator of the first embodiment can be obtained.

Figure 14:
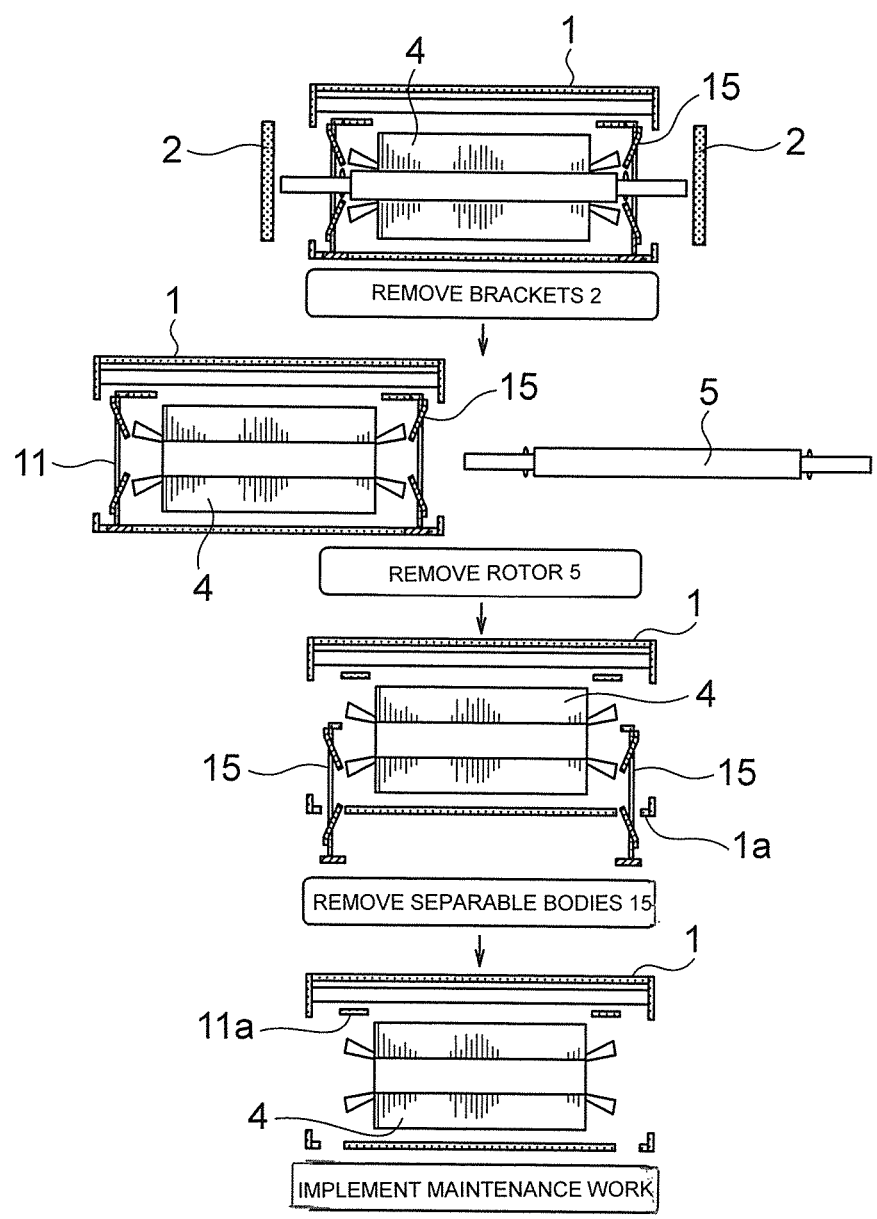
FIG. 14 is a diagram for illustrating a separation procedure of the power generator illustrated in FIG. 11.

Further, in the power generator of the second embodiment, as illustrated in FIG. 14, after the installation of the power generator, the separable bodies 15 can be moved downward from the first frame portion 1a to be separated therefrom. Thus, the gas coolers 13 are not required to be removed to remove the separable bodies 15.

As a procedure in this embodiment, after the brackets 2 mounted on both sides of the frame 1 are first removed, the rotor 5 is moved along the axial line direction of the frame 1 to be removed from the frame 1.

Thereafter, the separable bodies 15 are separated from the first frame portion 1a.

The procedure described so far is substantially the same as the procedure illustrated in FIG. 10 for the related-art power generator.

Thereafter, similarly to the power generator of the first embodiment, the separable bodies 15 that are provided in the peripheries of both sides of the stator 4 are separated from the first frame portion 1a. Therefore, working spaces equal to or larger than those of the related-art power generator illustrated in FIG. 10 during maintenance can be secured on both sides of the stator 4 in the axial line direction. Therefore, the workability in maintenance is improved.

Third Embodiment

Figure 15:
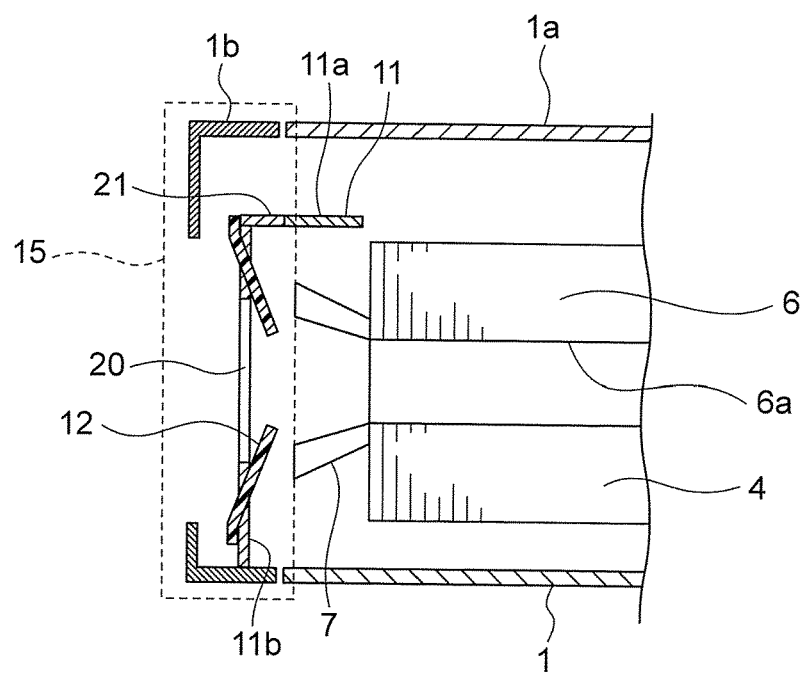
FIG. 15 is a partial sectional view for illustrating a power generator according to a third embodiment of the present invention when the separable bodies are separated from the power generator.

FIG. 15 is a partial sectional view for illustrating a power generator according to a third embodiment of the present invention when the separable bodies 15 are separated from the power generator.

In this embodiment, the separable body 15 includes the second frame portion 1b configured to be separated from the first frame portion 1a of the frame 1, the second partition plate portion 11b configured to be separated from the first partition plate portion 11a of the partition plate 11, and the end bell 12 integral with the second partition plate portion 11b.

The second frame portions 1b correspond to both the end portions of the frame 1.

The remaining configuration is the same as that of the power generator of the first embodiment.

Figure 16:
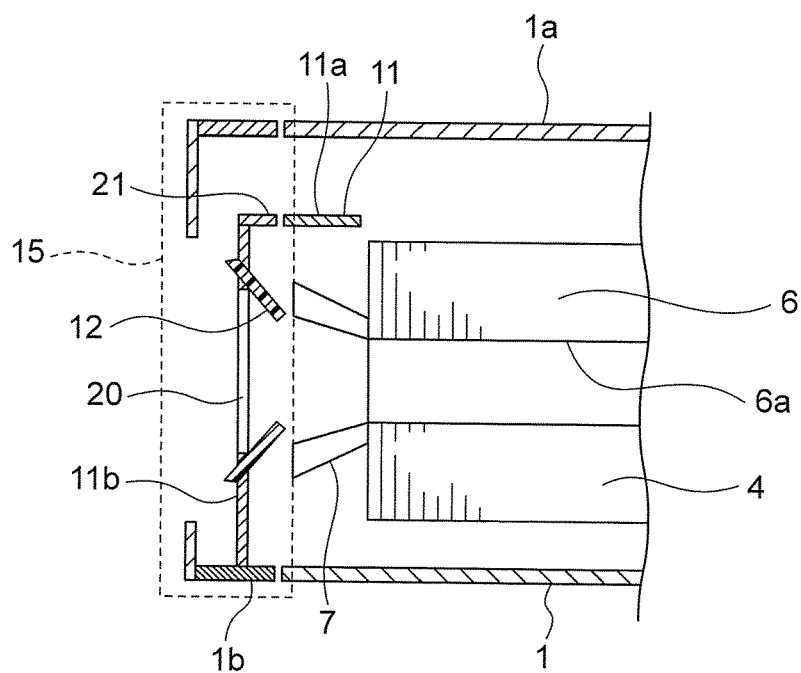
FIG. 16 is a partial sectional view for illustrating a power generator according to a third embodiment of the present invention when the separable bodies are separated from the power generator.

Similarly to the power generator of the first embodiment, even in the power generator of the third embodiment, the portion of the end bell 12, which is molded integrally with the second partition plate portion 11b of the partition plate 11 illustrated in FIG. 16, can be located closer to the rotor shaft 8 side, and the diameter of the end bell 12 can be set smaller than the outer diameter of the stator core 6. Thus, the same effects as those of the power generator of the first embodiment can be obtained.

Further, in each of the power generators of the first and second embodiments, at least two coupling portions for the first frame portion 1a and the second frame portion 1b are required on both sides of the second frame portion 1b for each separable body 15, specifically, four coupling portions are required in total for the separable bodies 15 provided on both sides of the frame 1.

On the other hand, in this embodiment, the number of coupling portions for the first frame portion 1a and the second frame portion 1b only needs to be at least two only for one side of the second frame portion 1b for each separable body 15.

As a result, the number of bolts used for coupling and the number of bolts to be fastened during coupling work are reduced to improve the workability in assembly.

Further, a separation procedure during maintenance of the power generator of the third embodiment is the same as the separation procedure for the power generator illustrated in FIG. 9 according to the first embodiment.

Further, as a result of the separation of the end portions of the frame 1, larger working spaces can be secured around the stator 4 as compared with the related-art power generator illustrated in FIG. 10 during the maintenance. Therefore, the workability in maintenance is improved.

Fourth Embodiment

Figure 17:
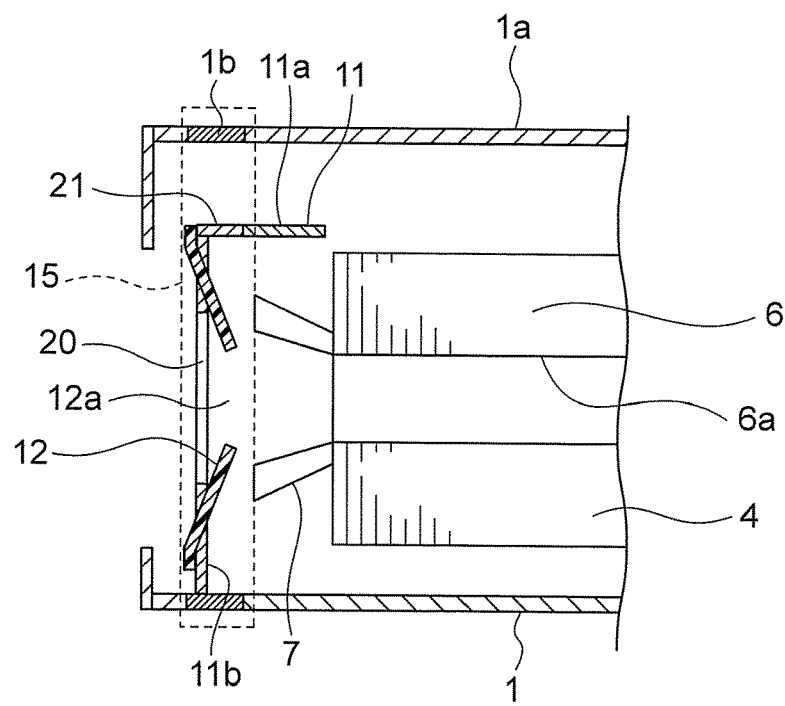
FIG. 17 is a partial sectional view for illustrating a power generator according to a fourth embodiment of the present invention.
Figure 18:
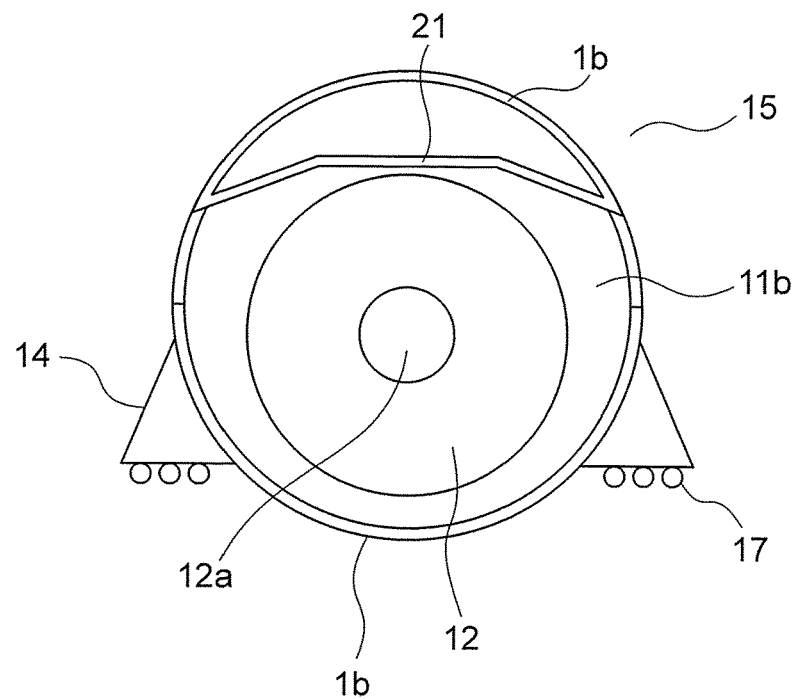
FIG. 18 is a front view for illustrating the separable body in FIG. 17.

FIG. 17 is a partial sectional view for illustrating a power generator according to a fourth embodiment of the present invention, and FIG. 18 is a front view for illustrating the separable body 15 in FIG. 17.

In this embodiment, the separable body 15 includes the second frame portion 1b configured to be separated from the first frame portion 1a of the frame 1, the second partition plate portion 11b configured to be separated from the first partition plate portion 11a of the partition plate 11, and the end bell 12 integral with the second partition plate portion 11b.

The second frame portions 1b are obtained by cutting both sides of the frame 1 into round slices.

Further, wheels 17 are mounted to the frame legs 14. The separable bodies 15 can be moved in the central axis line direction of the stator 4 so as to be removable from and insertable into the power generator.

The remaining structure is the same as that of the power generator of the first embodiment.

Figure 19:
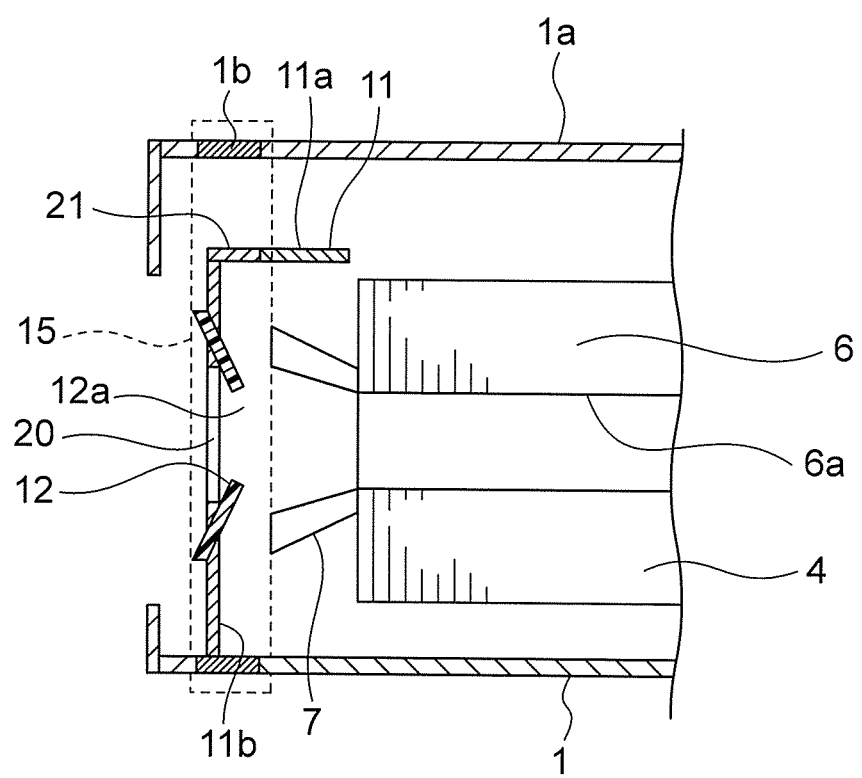
FIG. 19 is a partial sectional view for illustrating a power generator according to a fourth embodiment of the present invention.

Similarly to the power generator of the first embodiment, even in the power generator of the fourth embodiment, the portion of the end bell 12, which is molded integrally with the second partition plate portion 11b of the partition plate 11 illustrated in FIG. 19, can be located closer to the rotor shaft 8 side, and the diameter of the end bell 12 can be set smaller than the outer diameter of the stator core 6. Thus, the same effects as those of the power generator of the first embodiment can be obtained.

Further, in this embodiment, the separable bodies 15 can be moved by using the wheels 17 for assembly. As a result, the workability in assembly is improved.

Further, for maintenance after the installation of the power generator, similarly to the power generator of the first embodiment, after the rotor 5 and the gas coolers 13 are removed, the separable bodies 15 can be removed from the frame 1 by using the wheels 17. Thus, a working time period for the removal of the separable bodies 15 can be shortened.

Further, as a result of the separation of the end portions of the frame 1, larger working spaces can be secured around the stator 4 as compared with the related-art power generator illustrated in FIG. 10 during the maintenance. Therefore, the workability in maintenance is improved.

Note that, even in the power generator of the third embodiment described above, the same effects as those of the fourth embodiment can be obtained by providing the frame legs 14 to which the wheels 17 are mounted.

Fifth Embodiment

Figure 20:
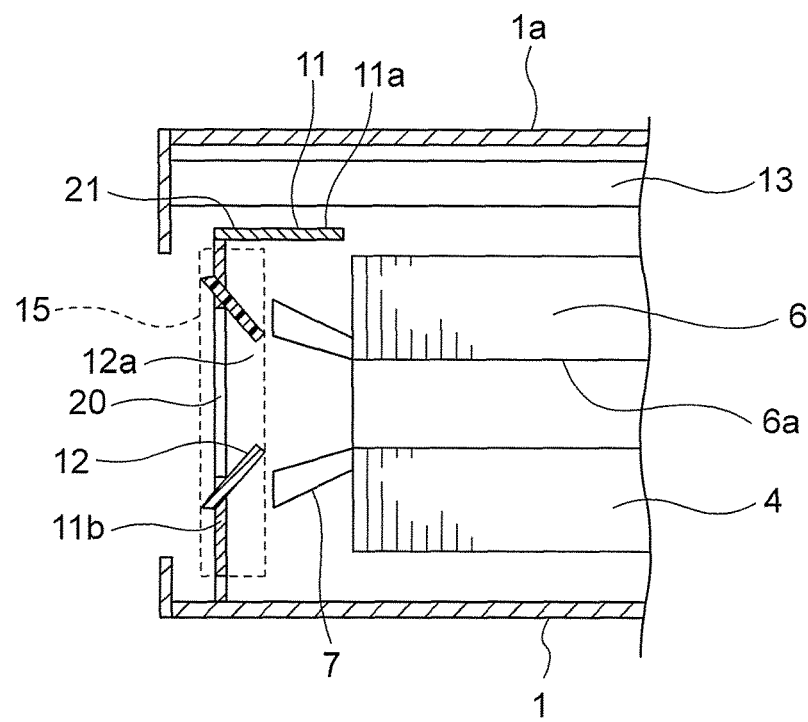
FIG. 20 is a partial sectional view for illustrating a power generator according to a fifth embodiment of the present invention.
Figure 21:
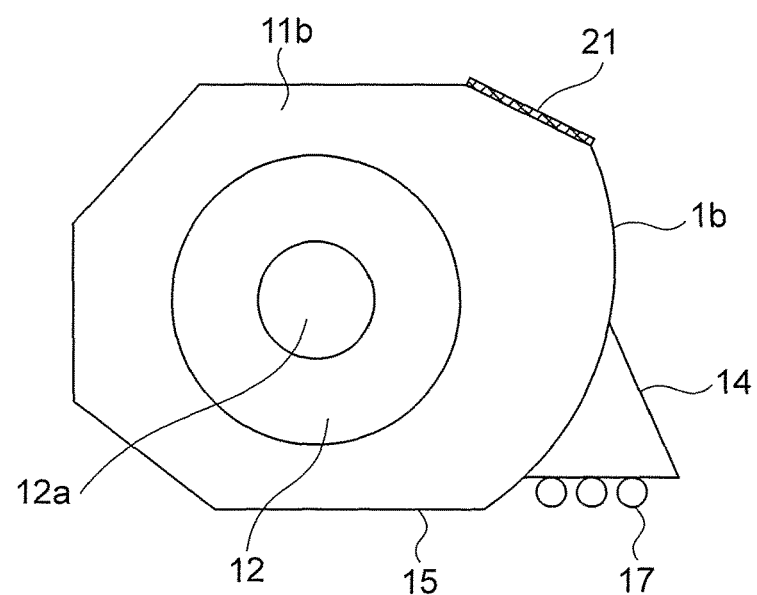
FIG. 21 is a front view for illustrating the separable body in FIG. 20.

FIG. 20 is a partial sectional view for illustrating a power generator according to a fifth embodiment of the present invention, and FIG. 21 is a front view for illustrating the separable body 15 in FIG. 20 as viewed from the right side.

In this embodiment, the separable body 15 includes the second frame portion 1b configured to be separated from the first frame portion 1a of the frame 1, the second partition plate portion 11b configured to be separated from the first partition plate portion 11a of the partition plate 11, the end bell 12 integral with the second partition plate portion 11b, and the frame leg 14.

The second frame portions 1b are obtained by cutting the frame 1 on both sides from a lower side of the frame 1 to the middle along a circumferential direction to have a constant width in the axial line direction. The outer diameter of the separable bodies 15 is larger than the outer diameter of the stator 4.

Further, similarly to the power generator of the fourth embodiment, the wheels 17 are mounted to the frame legs 14. As a result, the separable bodies 15 are moved in the horizontal direction perpendicular to the axial line of the rotor shaft 8 so as to be removable from and insertable into the power generator.

The remaining structure is the same as that of the power generator of the first embodiment.

Similarly to the power generator of the first embodiment, even in the power generator of the fifth embodiment, the portion of the end bell 12, which is molded integrally with the second partition plate portion 11b of the partition plate 11 illustrated in FIG. 20, can be located closer to the rotor shaft 8 side, and the diameter of the end bell 12 can be set smaller than the outer diameter of the stator core 6. Thus, the same effects as those of the power generator of the first embodiment can be obtained.

Further, as described above, owing to the use of the insulating resin for the end bells 12, the separable bodies 15 are restricted in dimension only in that the outer shape is larger than that of the stator 4. By forming the separable bodies 15 as small as possible while satisfying the dimensional restriction in outer shape, the separable bodies 15 can be reduced in weight. As a result, the assembly and the separation of the separable bodies 15 from the power generator can be easily carried out.

Further, in the fifth embodiment, the separable bodies 15 can be moved by using the wheels 17 for assembly. As a result, the workability in assembly is improved.

Further, for maintenance after the installation of the power generator, similarly to the power generator of the first embodiment, after the rotor 5 and the gas coolers 13 are removed, the separable bodies 15 are removed from the frame 1 by using the wheels 17. By using the wheels 17, a working time period for the removal of the separable bodies 15 can be shortened as compared with the power generator without the wheels 17.

Sixth Embodiment

Figure 22:
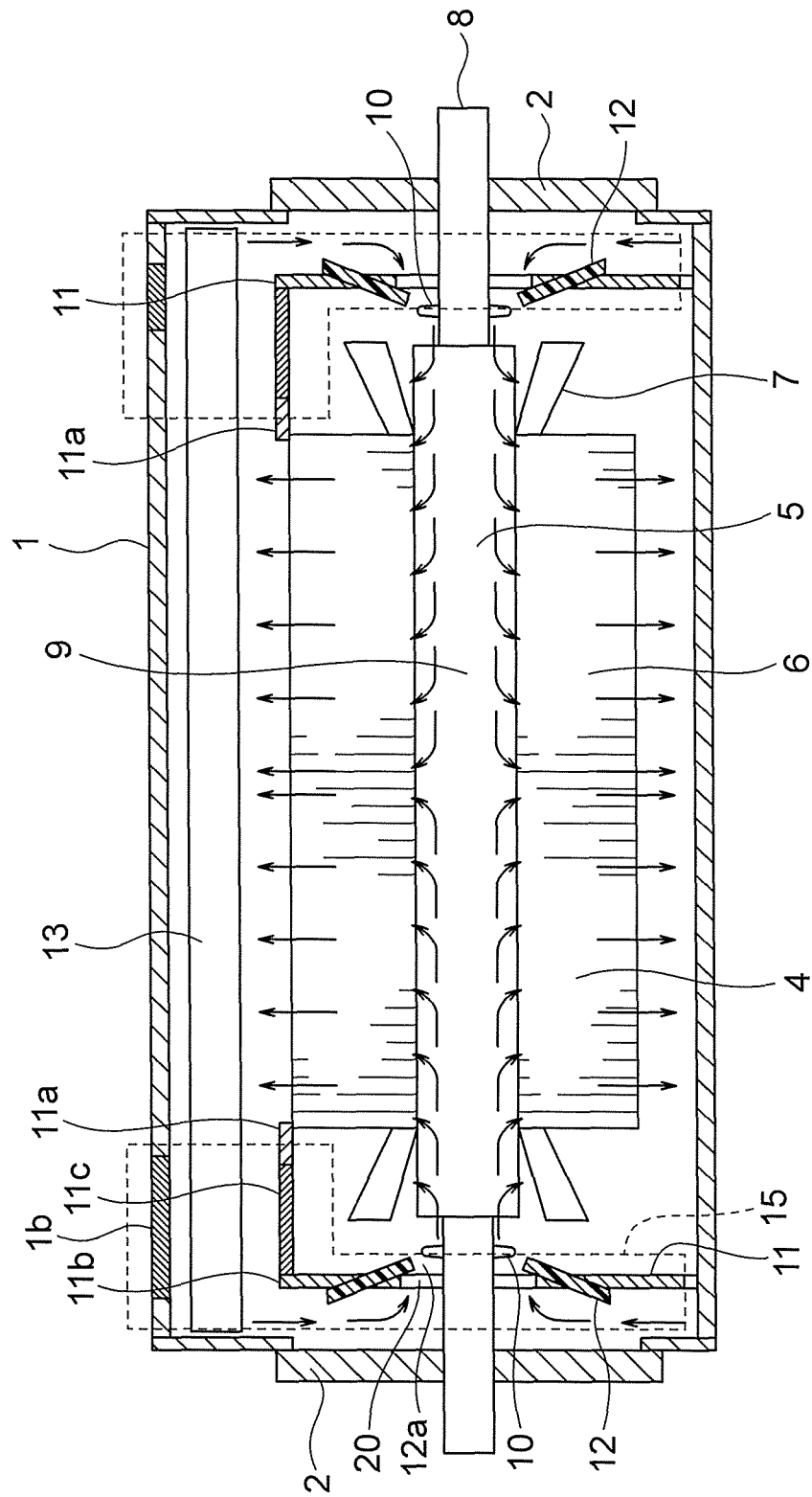
FIG. 22 is a side sectional view for illustrating a power generator according to a sixth embodiment of the present invention.
Figure 23:
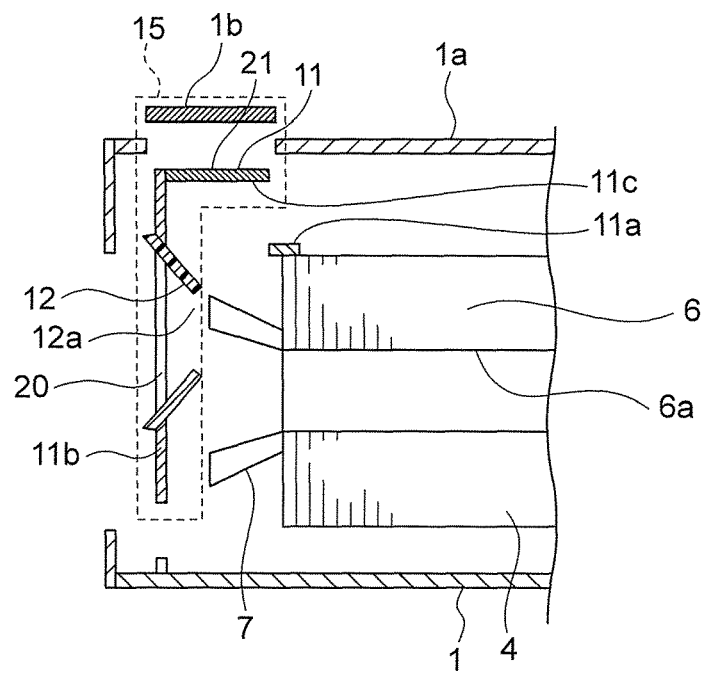
FIG. 23 is a partial sectional view for illustrating separation of the separable body illustrated in FIG. 22.

FIG. 22 is a side sectional view for illustrating a power generator according to a sixth embodiment of the present invention, and FIG. 23 is a partial sectional view for illustrating separation of the separable body 15 illustrated in FIG. 22.

The separable body 15 includes the second frame portion 1b configured to be separated from the first frame portion 1a of the frame 1, the second partition plate portion 11b and a third partition plate portion 11c configured to be separated from the first partition plate portion 11a, and the end bell 12 molded integrally with the second partition plate portion 11b.

The third partition plate portion 11c made of the insulating resin is molded integrally with the second partition plate portion 11b made of iron at a base end portion. Further, a distal end portion of the third partition plate portion 11c extends along the axial line direction of the stator 4 and has the same function as that of the guiding portion 21 of the power generators of the first to fifth embodiments.

The second frame portions 1b correspond to upper portions of the frame 1.

In a case where the third partition plate portions are made of a metal such as iron, when the third partition plate portions are installed so as to be close to the stator coil 7 in the radial direction, a magnetic loss becomes significant even in the third partition plate portions as in the case where the end bells are made of a metal. Thus, a loss equal to that in the end bell is generated.

In order to reduce the loss, the third partition plate portions 11c are also made of an insulating resin that is non-metallic.

Further, when the third partition plate portions 11c made of the insulating resin are fastened with bolts to the first partition plate portions 11a and the second partition plate portions 11b, each being made of a metal, the coupling force generated by the axial forces of the bolts is reduced in the coupling portions due to the deterioration over time. In order to prevent such an event, the third partition plate portions 11c are respectively integrated with the second partition plate portions 11b by integral molding.

Similarly to the power generator of the first embodiment, even in the power generator of the sixth embodiment, the portion of the end bell 12, which is molded integrally with the second partition plate portion 11b of the partition plate 11 illustrated in FIG. 23, can be located closer to the rotor shaft 8 side, and the diameter of the end bell 12 can be set smaller than the outer diameter of the stator core 6. Thus, the same effects as those of the power generator of the first embodiment can be obtained.

Further, procedures of assembling and separating the power generator of the sixth embodiment are the same as those of the power generator of the first embodiment.

Thus, by the power generator of the sixth embodiment, the loss in the third partition plate portions 11c that are located at positions close to the stator coil 7 in terms of structure is reduced while securing the same effects as those of the power generator of the first embodiment.

Further, as a result of the separation of the end portions of the frame 1, larger working spaces can be secured around the stator 4 as compared with the related-art power generator illustrated in FIG. 10 during the maintenance. Therefore, the workability in maintenance is improved.

Further, when the shortest distance between each of the third partition plate portions 11c and the stator coil 7 becomes smaller than the shortest distance between each of the end bells 12 and the stator coil 7, only the third partition plate portions 11c may be made of the insulating resin.

Seventh Embodiment

Figure 24:
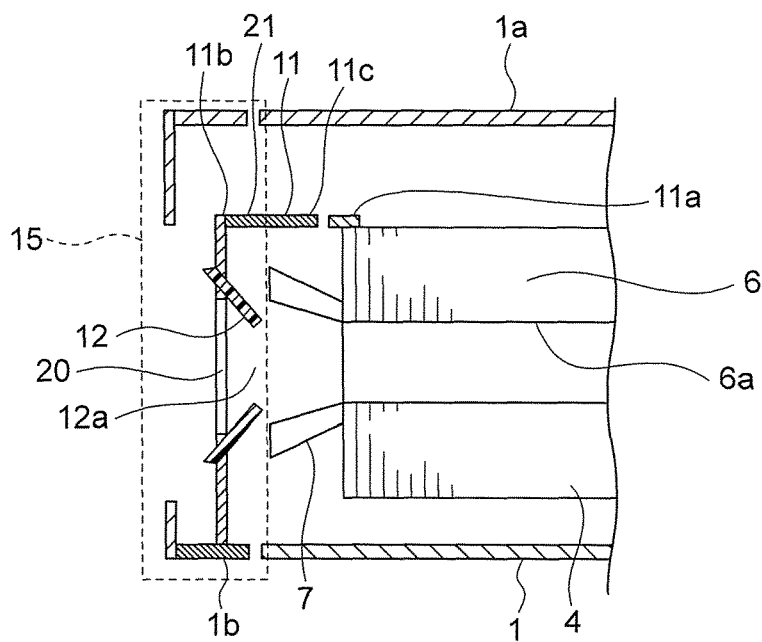
FIG. 24 is a partial sectional view for illustrating a power generator according to a seventh embodiment of the present invention when the separable bodies are separated from the power generator.

FIG. 24 is a partial sectional view for illustrating a power generator according to a seventh embodiment of the present invention when the separable bodies 15 are separated from the power generator.

The separable body 15 includes the second frame portion 1b configured to be separated from the first frame portion 1a of the frame 1, the second partition plate portion 11b and the third partition plate portion 11c configured to be separated from the first partition plate portion 11a, and the end bell 12 molded integrally with the second partition plate portion 11b.

The third partition plate portion 11c made of an insulating resin is molded integrally with the second partition plate portion 11b made of iron at a base end portion. Further, a distal end portion of the third partition plate portion 11c extends along the axial line direction of the stator 4 and has the same function as that of the guiding portion 21 of the power generators of the first to fifth embodiments.

The second frame portions 1b are portions corresponding to both side end portions of the frame 1.

The remaining configuration is the same as that of the power generator of the third embodiment illustrated in FIG. 15.

For the power generator of the seventh embodiment, portions corresponding to the separable bodies 15 to be separated from the power generator are different from those of the power generator of the sixth embodiment. However, the same effects as those of the power generator of the sixth embodiment can be obtained.

Further, in this embodiment, the number of coupling portions for the first frame portion 1a and the second frame portion 1b only needs to be at least two only for one side of the second frame portion 1b for each separable body 15.

As a result, the number of bolts used for coupling and the number of bolts to be fastened during the coupling work are reduced to improve the workability in assembly.

Note that, even in the power generator of this embodiment, the same effects as those of the fourth embodiment can be obtained by providing the frame legs 14 to which the wheels 17 are mounted.

Note that, although the power generator that is a rotary electric machine has been described in each of the embodiments, the present invention is also applicable to electric motors.

Further, although the bolts and nuts that are coupling means are used to couple the first frame portions 1a and the second frame portions 1b to each other in each of the embodiments, the coupling may be achieved through welding instead.

Further, the number of bolts and nuts may be reduced by replacing some of the bolts and nuts with the welding.

Further, the present invention is also applicable even to a power generator in which the end bell 12, the partition plate 11, and the axial fan 10 are provided only on one side of the stator 4.

Further, the fans are not limited to the axial fans. Further, the cooling air circulating inside the case 3 may be refrigerant other than air, such as hydrogen.

Further, the present invention is also applicable to power generators without gas coolers.

Further, the frame 1 is not limited to that having the cylindrical shape, and may have, for example, an ellipsoidal sectional shape.

REFERENCE SIGNS LIST 1 frame, 1a first frame portion, 1b second frame portion, 2 bracket, 3 case, 4 stator, 5 rotor, 6 stator core, 6a hole, 7 stator coil, 8 rotor shaft, 9 rotor core, 10 axial fan, 11, 11A partition plate, 11a first partition plate portion, 11b second partition plate portion, 11c third partition plate portion, 12 end bell, 12a hole, 13 gas cooler, 14 frame leg, 15 separable body, 16 through hole, 17 wheel, 20, 20A ventilation hole, 21, 21A guiding portion

The invention claimed is:
1. A rotary electric machine, comprising:
a frame, which has a cylindrical shape;
a stator, which is provided inside the frame so as to be supported by the frame;

a rotor, which is provided to extend on a central axis line of the stator;

a fan, which is mounted to a rotary shaft of the rotor, and is configured to generate a cooling air flow;

a partition plate, which is provided on at least one side of the stator in an axial line direction of the stator, and is configured to circulate the cooling air flow inside the stator and to guide the cooling air flow toward the fan; and an end bell, which is provided to the partition plate, and is configured to form an air ventilation path for the cooling air flow between the partition plate and the fan, the end bell being made of an insulating resin, the frame comprising a first frame portion and a second frame portion, which is configured to be separated from the first frame portion, the partition plate comprising a first partition plate portion and a second partition plate portion, which is made of a metal integrally with the end bell, and is configured to be separated from the first partition plate portion, the second frame portion, the second partition plate portion, and the end bell being integrated to form a separable body, which is configured to be separated from the first frame portion and the first partition plate portion.

2. A rotary electric machine according to claim 1, wherein:

the partition plate has a plurality of through holes formed therethrough; and the end bell contains a reinforced fiber resin passing through each of the plurality of through holes in a corrugated fashion.

3. A rotary electric machine according to claim 1, wherein the separable body further comprises a third partition plate portion, which is made of an insulating resin, and is molded integrally with the second partition plate portion.

4. A rotary electric machine according to claim 1, wherein:

the second frame portion comprises an upper portion of the frame; and the separable body is configured to be moved upward along a direction perpendicular to the central axis line of the stator to be separated from the first frame portion and the first partition plate portion.

5. A rotary electric machine according to claim 1, wherein:

the second frame portion comprises a lower portion of the frame; and the separable body is configured to be moved downward along a direction perpendicular to the central axis line of the stator to be separated from the first frame portion and the first partition plate portion.

6. A rotary electric machine according to claim 1, wherein:

the second frame portion comprises an end portion of the frame; and the separable body is configured to be moved along a direction of the central axis line of the stator to be separated from the first frame portion and the first partition plate portion.

7. A rotary electric machine according to claim 1, wherein:

the second frame portion comprises a round slice obtained by cutting the frame; and the separable body is configured to be moved along a horizontal direction perpendicular to the central axis line of the stator to be separated from the first frame portion and the first partition plate portion.

8. A rotary electric machine according to claim 5, further comprising a wheel, which is mounted to a frame leg portion provided to a lower portion of the second frame portion.

9. A rotary electric machine according to claim 1, wherein the first frame portion and the second frame portion are coupled by coupling means.

10. A rotary electric machine according to claim 9, wherein the coupling means comprises a bolt and a nut, and wherein the coupling means additionally comprises welding.

* * * * *